United States Patent [19]
Bermes et al.

[11] Patent Number: 5,575,140
[45] Date of Patent: Nov. 19, 1996

[54] APPARATUS FOR TRANSPORTING OPERATOR BEHIND SELF-PROPELLED VEHICLE

[75] Inventors: Steven P. Bermes; Gregory J. Bermes, both of Fort Wayne, Ind.

[73] Assignee: Novae Corp., Fort Wayne, Ind.

[21] Appl. No.: 453,216

[22] Filed: May 30, 1995

[51] Int. Cl.$^6$ ............................ A01D 34/67; A01D 67/04
[52] U.S. Cl. .................................. 56/14.7; 56/2; 172/433; 280/32.7
[58] Field of Search .......................... 56/14.7, 1, 2, 16.7, 56/323, 228, DIG. 9; 280/32.7, 78, 32.5; 180/19.1, 19.3; 172/433

[56] References Cited

U.S. PATENT DOCUMENTS

| | | |
|---|---|---|
| D. 243,161 | 1/1977 | Tolar .......................................... D12/14 |
| 1,764,971 | 6/1930 | Nilson . |
| 2,657,408 | 11/1953 | Machovec . |
| 2,955,835 | 10/1960 | Chouinard . |
| 3,190,672 | 6/1965 | Swanson et al. . |
| 3,336,042 | 8/1967 | Southall . |
| 3,485,314 | 12/1969 | Herr . |
| 4,010,507 | 3/1977 | Johnson ................................. 15/49 R |
| 4,175,762 | 11/1979 | Vaughn et al. ............................ 280/78 |
| 4,192,525 | 3/1980 | Clark .................................. 280/32.7 X |
| 4,487,006 | 12/1984 | Scag ......................................... 56/14.7 |
| 4,828,282 | 5/1989 | Pinto ..................................... 280/32.7 |
| 4,848,504 | 7/1989 | Olson ...................................... 180/191 |
| 4,878,339 | 11/1989 | Marier et al. ............................. 56/14.7 |
| 4,989,351 | 2/1991 | Shear ....................................... 37/242 |
| 4,998,948 | 3/1991 | Osterling ................................. 56/12.6 |
| 5,004,251 | 4/1991 | Velke et al. ............................ 280/32.7 |
| 5,413,364 | 5/1995 | Hafendorfer ........................ 172/433 X |

OTHER PUBLICATIONS

Product brochure, Turf Rider Inc. (date unknown).
Product brochure, Jungle Jim's Accessory Products, Inc. (date unknown).

*Primary Examiner*—Terry Lee Melius
*Attorney, Agent, or Firm*—George Pappas

[57] ABSTRACT

An apparatus in combination with or attachable to a self-propelled vehicle such as a lawn mower for transporting the operator therebehind. The apparatus includes a first arm pivotally connected to the lawn mower, a second arm pivotally connected to the first arm and a support platform pivotally connected to the second arm. The apparatus is spring loaded for biasing the first and second arms and the support platform in a retracted storage position during which the operator can walk behind the lawn mower. The apparatus is selectively extendable to an in use ride behind position during which the operator may stand on the support platform and ride behind the self-propelled lawn mower. The support platform includes a sliding plate for sliding on the ground and reducing frictional forces when the operator is standing on the support platform.

31 Claims, 7 Drawing Sheets

APPARATUS FOR TRANSPORTING OPERATOR BEHIND SELF-PROPELLED VEHICLE

TECHNICAL FIELD

The present invention generally relates to the technical field of self-propelled vehicles such as self-propelled lawn mowers. More specifically, the present invention relates to an apparatus that is in combination with or attachable to the rear of the self-propelled vehicle and which is used for transporting the operator behind the self-propelled vehicle.

BACKGROUND OF THE INVENTION

Numerous apparatus have, in the past, been conceived for transporting an operator behind a self-propelled vehicle that is normally used by the operator by walking therebehind. Vehicles of this character typically include self-propelled lawn mowers, sweepers, snow blowers, etc. The operator carrying and transporting apparatus, also typically known as a caddie or sulky, can be permanently attached to the self-propelled vehicle or detachably attachable thereto. Such self-propelled vehicles typically always include a set of arms with handles thereon that are selectively grasped by the operator and which are used for guiding the vehicle. Control of the vehicle's speed and other operations are also typically accomplished by levers and other mechanisms located generally close to the handles and which are typically easily reached and used by the operator. Additionally, such vehicles are generally powered by a combustion engine of a sufficient size and are geared appropriately, not only to accomplish the needed task of cutting grass, throwing snow, sweeping, etc., but also for propelling the vehicle at a desired speed. The combustion engine is also typically of sufficient size to pull therebehind the apparatus whereupon the operator may stand and be transported along with the self-propelled vehicle. In this fashion, the operator need only stand on the apparatus guiding and controlling the various functions of the vehicle for accomplishing the desired end result.

An example of an apparatus for transporting the operator behind a self-propelled lawn mower is shown in U.S. Pat. No. 4,828,282. There, a caddie supported on two wheels is selectively pivotally hitched to the rear of a self-propelled lawn mower. Advantageously, the operator need only stand on the caddie and control the self-propelled lawn mower by use of the arms and thereby maneuvering the lawn mower as may be needed around shrubbery, trees, etc. Another similar apparatus is shown in U.S. Pat. No. 4,989,351 wherein a platform supported on a pair of wheels is again selectively hitched to the rear of a self-propelled vehicle, here a self-propelled snow thrower. Although these apparatus are capable of supporting and transporting the operator behind the self-propelled vehicle, in practice, they are difficult to use because the operator cannot easily and quickly switch between a walk behind mode of operation and a ride behind mode of operation. Quite often, especially in tight radius turning and where forward and reverse motion is changed rapidly, it is desirable for the operator to merely walk behind the vehicle rather than ride. At other times, the operator may desire to walk behind the vehicle due to the terrain i.e., very bumpy, high slope, etc. It is also typically more desirable and easy to walk behind the vehicle when traveling in reverse. Unfortunately, the prior hitch-on type caddies are not easily detachable and the operator is forced to either walk to the side of the hitched caddie and vehicle or go through the attachment and detachment operation each time the mode of operation is required to be changed. As can be appreciated, walking to the side of the vehicle and apparatus is awkward, may cause jackknifing, and can be dangerous. Additionally, constantly detaching or attaching the apparatus to the vehicle is laborious, time-consuming, and not cost effective.

Apparatus for transporting the operator behind a self-propelled vehicle and which are selectively placed between a retracted walk behind storage position and an in use ride behind position have also been conceived and examples of such devices are shown in U.S. Pat. No. 3,485,314, 4,878, 339 and 5,004,251. Unfortunately, in each case these devices require at least some support from the control arms. Additionally, the operation of each apparatus greatly depends on the self-propelled vehicle structure and each such apparatus are not easily readily adaptable for use with other self-propelled vehicles. For example, in U.S. Pat. No. 4,878,339 the operator support platform, when in use, is supported by a pair of rods extending up to the control arms and, for the walk behind mode the platform is pivoted and stored under the self-propelled lawn mower. Unfortunately, many self-propelled lawn mowers do not have sufficient clearance for easily pivoting and storing the support platform thereunder and thereby making such apparatus impractical for different vehicles. Further, in the case of the apparatus shown in U.S. Pat. Nos. 3,485,314 and 5,004,251 placement of the apparatus in its storage position requires the operator to manually lift and latch the apparatus in its storage position. As can be appreciated, these apparatus again are laborious, time-consuming, and not cost effective, especially during uses of the vehicle where the operator must switch quite often between the walk behind and the ride behind modes of operation.

Accordingly, a need exists for an apparatus for attachment and use with a self-propelled vehicle for selectively transporting the operator therebehind and which is easily adaptable for use behind different makes and models of self-propelled vehicles and which is easily and readily placed in a retracted storage position during which the operator walks behind the vehicle and an extended in use position during which the operator stands on the apparatus and rides along with the vehicle therebehind.

SUMMARY OF THE INVENTION

It is the principal object of the present invention to overcome the above-discussed disadvantages associated with prior apparatus for transporting operators behind self-propelled vehicles.

The present invention overcomes the disadvantages associated with prior apparatus for transporting operators behind self-propelled vehicles by providing an apparatus that is attachable to a rear wall of the self-propelled vehicle. The apparatus is attached to the self-propelled vehicle either directly or via an attachment member and a first arm is pivotally connected to the attachment member or directly to a rear wall of the vehicle. A second arm is pivotally connected to the first arm and an operator support platform is pivotally connected to the second arm. The first and second arms and the support platform are spring biased so as to be retractable in a storage position during which the first and second arms and the support platform are positioned in different planes but generally parallel to one another. In the storage or walk behind position, the first and second arms and the support platform extend upwardly from the rear of the vehicle and away from the area whereat the operator requires for walking behind the vehicle.

For placing the apparatus in the ride behind mode, the operator need only reach up with his foot and step down on the support platform working against the bias forces of the springs and causing the first and second arms and support platform to be extended in the in use or ride behind position for carrying and transporting the operator behind the self-propelled vehicle. The support platform includes a sliding plate that comes in contact and slides on the surface therebelow i.e., grass, dirt, concrete, etc., while the operator is merely standing and is being transported on the support platform. For placement back in the retracted storage position, the operator steps off of the support platform allowing the springs to pivotally move and place the first and second arms and support platform in the retracted storage position.

Preferably, a first spring is provided between the first arm and the attachment member or the vehicle rear wall for biasing the first arm generally upwardly. This first spring can be a compression spring, pneumatic cylinder, gas spring, torsion spring, or other spring mechanisms for accomplishing the necessary biasing. A second spring mechanism is also provided for torsionally biasing the first and second arms about the pivotal connection therebetween and toward each other. This spring mechanism can be a torsion spring. Alternatively, a pivot member can be provided and pivotally connected to the first arm and a second spring connected between the pivot member and the first arm thereby pivotally biasing the pivot member. A coupling member such as a chain is connected between the pivot member and the second arm thereby torsionally biasing the first and second arms toward each other. A third spring is also provided and is connected between the second arm and the support platform and thereby torsionally biasing the second arm and the support platform about the pivotal connection therebetween and toward each other. The third spring is preferably a torsion spring.

Although it is contemplated that a pair of wheels could be used for supporting the support platform, preferably a sliding plate is provided on the lower surface of the support platform in a manner whereby when the support platform is in its extended in use or ride behind position, the sliding plate comes in contact with and slides on the surface therebelow. For decreasing the frictional forces between the sliding plate and the ground surface, preferably the sliding plate is made of ultra high molecular weight polyethylene (UHMWPE).

In one form thereof, the present invention is directed to an apparatus that is attachable to a self-propelled vehicle for transporting an operator therebehind. The apparatus includes an attachment member selectively attachable to a self-propelled vehicle. A first arm is pivotally connected to the attachment member and a second arm is pivotally connected to the first arm. An operator support platform is pivotally connected to the second arm in a manner whereby the first and second arms and the support platform are selectively pivotable for placing the platform in a retracted storage position and in an extended in use position for carrying and transporting an operator behind the self-propelled vehicle.

In one form thereof, the present invention is directed to a combination self-propelled lawn mower and apparatus for transporting an operator behind the lawn mower. The apparatus includes a first arm pivotally connected to the lawn mower and a second arm pivotally connected to the first arm. An operator support platform is pivotally connected to the second arm in a manner whereby the first and second arms and the support platform are selectively pivotable for placing the platform in a retracted storage position and in an extended in use position for carrying and transporting an operator behind the self-propelled lawn mower.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

Figure 1:
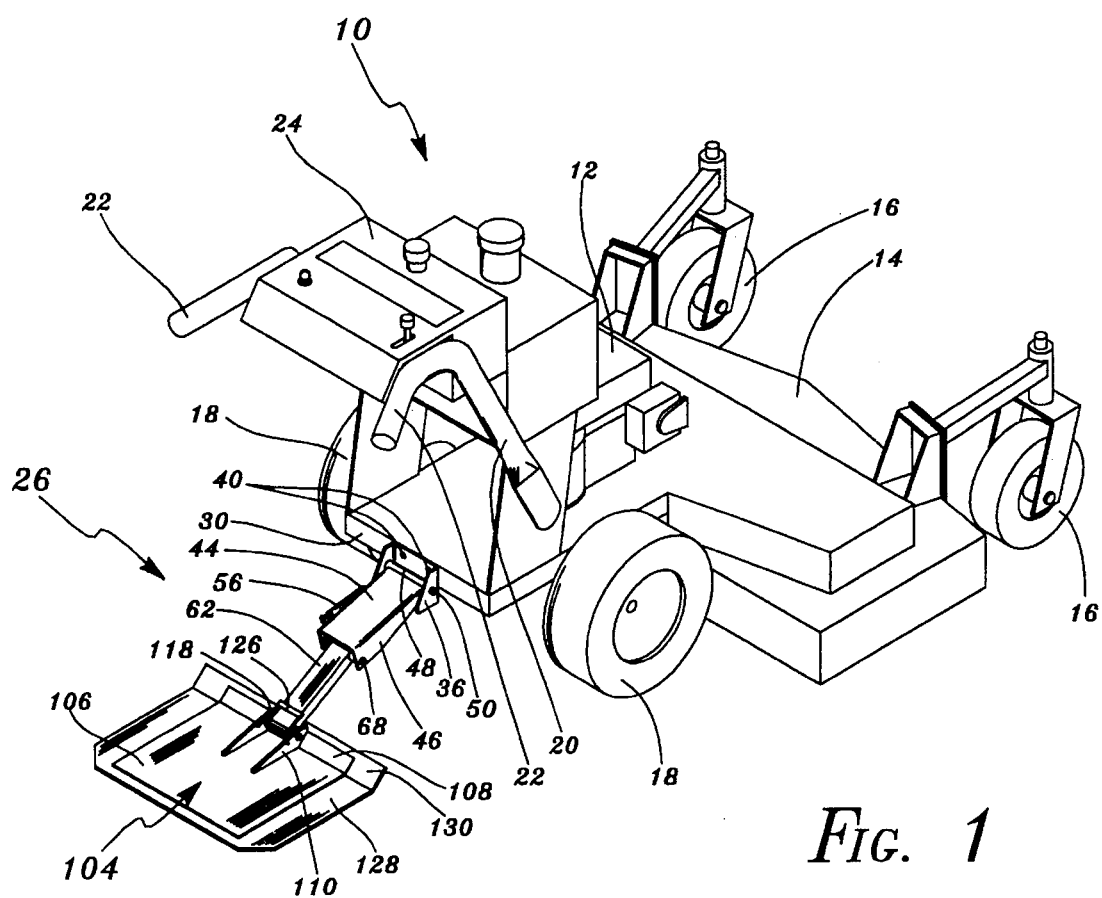
FIG. 1 is a perspective view of a combination self-propelled lawn mower and apparatus for transporting an operator therebehind constructed in accordance with the principles of the present invention.

Referring initially to FIG. 1, there is shown a self-propelled vehicle and, more specifically, a self propelled lawn mower generally designated by the numeral 10. Lawn mower 10 includes a combustion engine 12, mower deck 14, front caster wheels 16, and rear driven wheels 18. Combustion engine 12 is adapted to and powers mower deck 14 and rear driven wheels 18 in a known and customary manner. Self-propelled lawn mower 10 further includes a pair of arms 20 and handles 22 whereat wheel drive controls are located (not shown) and through which the left and right driven wheels 18 are selectively engaged for steering lawn mower 10 in a known and customary manner. Control panel 24 is also provided on lawn mower 10 whereat additional machinery and components of lawn mower 10 i.e., mower deck height, engine speed, overall mower speed, etc., can be monitored and/or controlled.

Figure 2:
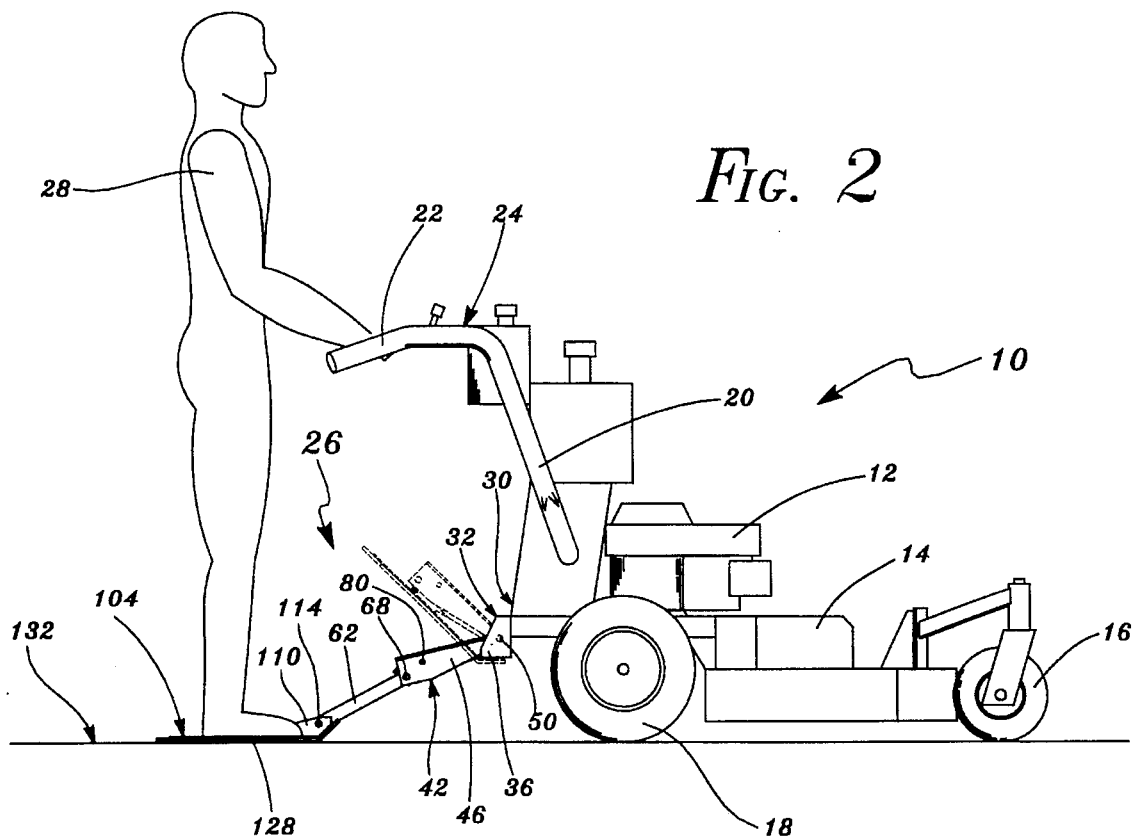
FIG. 2 is a side elevation view of the self-propelled lawn mower and apparatus for transporting an operator shown in FIG. 1 and further diagrammatically showing an operator being transported thereon.

Self-propelled lawn mower 10 is further equipped with an apparatus generally designated by the numeral 26 for carrying and transporting an operator generally depicted by the numeral 28 as shown in FIG. 2. Apparatus 26 is attached to rear wall 30 of lawn mower 10 preferably via an attachment member 32. Attachment member 32 is generally U-shaped including a lower web portion 34 located inbetween upright walls 36. A plurality of holes 38 are provided through lower web portion 34 and bolts 40 extend through holes 38 thereby attaching member 32 to rear wall 30 of self-propelled lawn mower 10. Attachment member 32 is preferably made of steel with upright walls 36 being bent perpendicularly with respect to lower web portion 34.

A first arm 42 is also provided and is generally U-shaped including a web portion 44 and upright walls 46. First arm 42 is also preferably made of steel with upright walls 46 being bent perpendicularly with respect to web portion 44.

At one longitudinal end thereof first arm 42 is provided with a cylindrical member 48. Cylindrical member 48 is also made of steel and is affixed to first arm 42 by welding or other suitable means. In the alternative, cylindrical member 48 can be formed by bending an end section of web portion 44 so as to form an integral cylindrical member. First pin 50 is received through holes 52 in upright walls 36 and through cylindrical member 48 thereby pivotally connecting first arm 42 to attachment member 32. Accordingly, first arm 42 and attachment member 42 are rotatable with respect to one another about first pivot axis 54 shown in FIG. 3.

Figure 4:
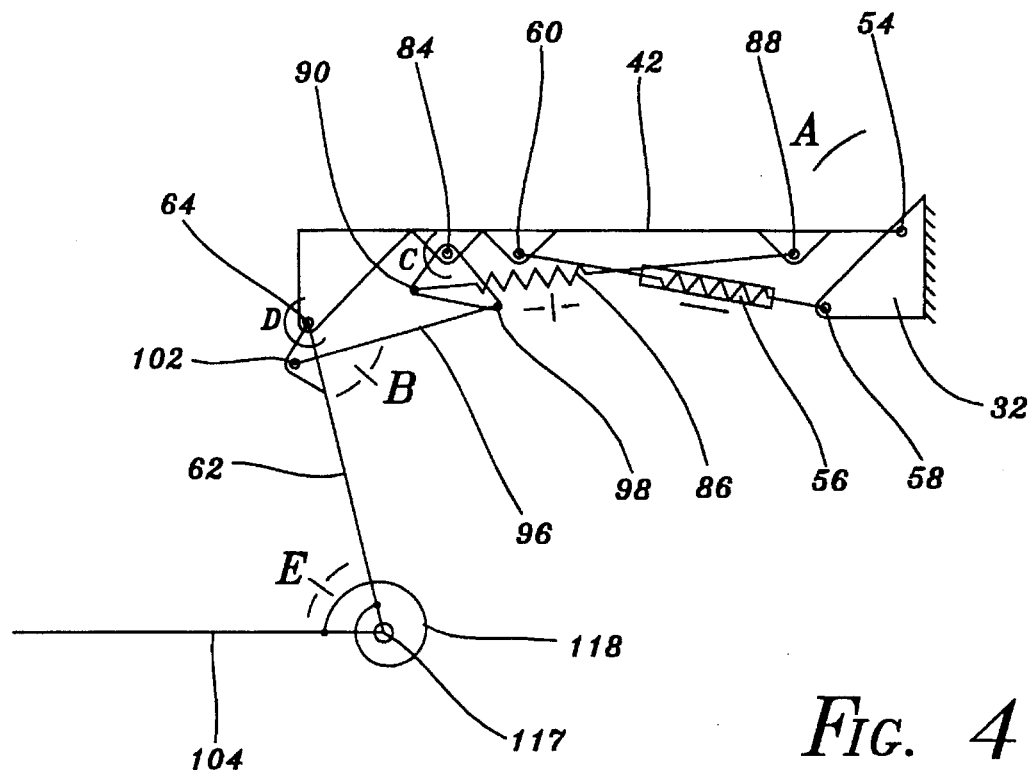
FIG. 4 is a linkage schematic diagram of the apparatus shown in FIG. 3.
Figure 5:
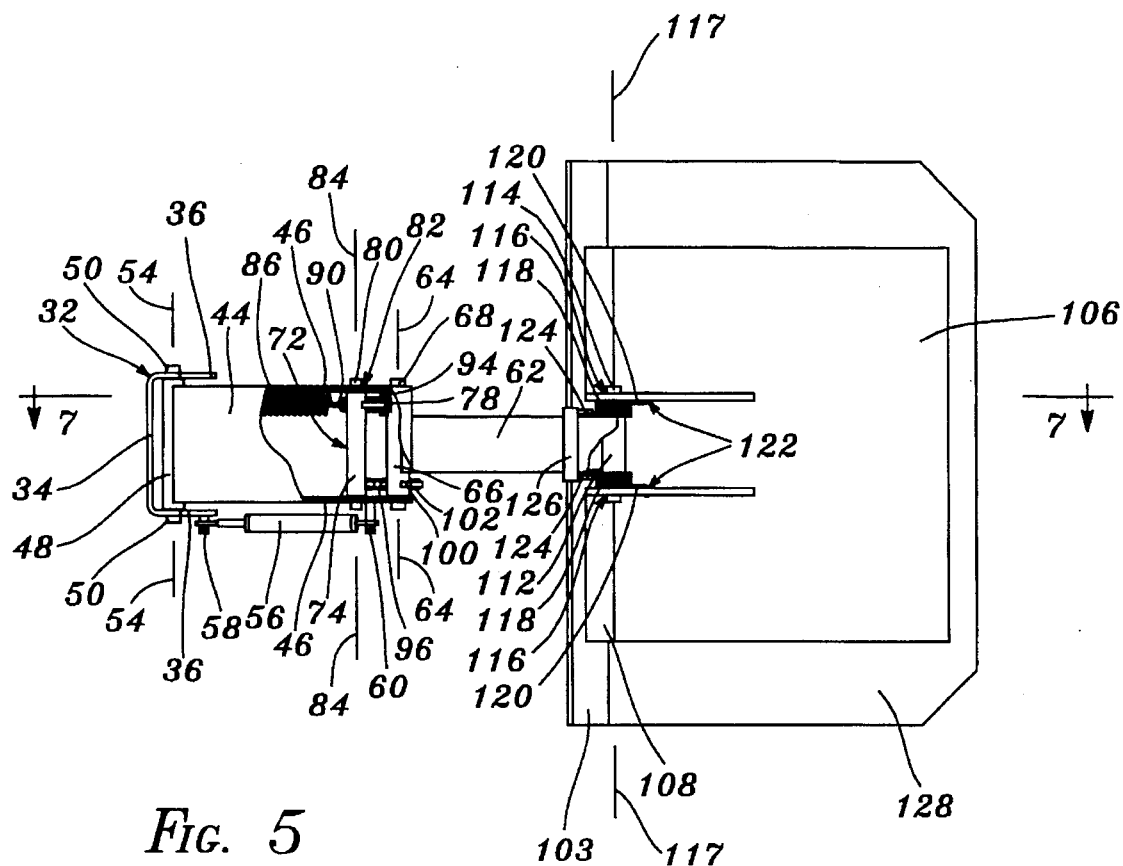
FIG. 5 is a top plan view with a partial cut-away section of the apparatus shown in FIG. 3.
Figure 6:
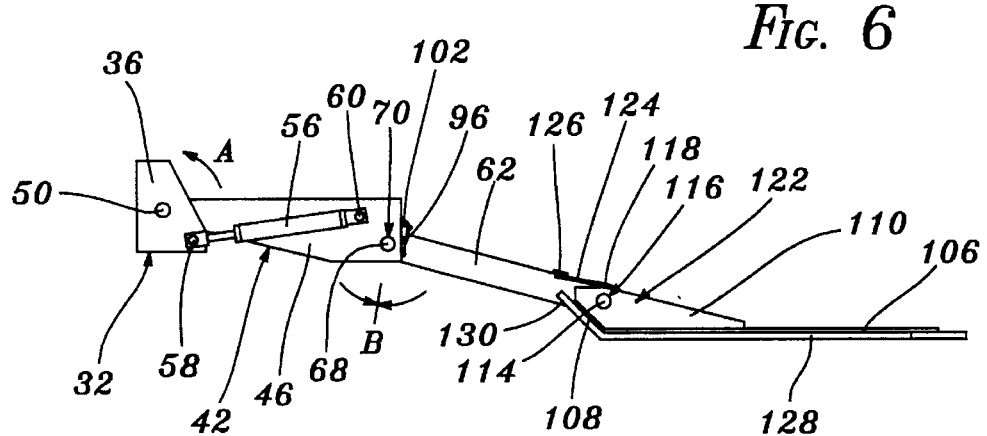
FIG. 6 is a side elevation view of the apparatus shown in FIG. 3.

As best shown in FIGS. 4–6, a first spring member 56 is pivotally connected between attachment member 42 and first arm 42 via a stud 58 protruding from attachment member upright wall 36 and a stud 60 protruding from one of the first arm upright walls 46. Spring member 56 is preferably a compression spring, pneumatic cylinder or gas spring and, due to the location of pivot axis 54 and studs 58 and 60, first spring member 56 biases first arm 42 about pivot axis 54 and generally upwardly as indicated by arrow A. It is noted that a tension spring could be used for spring member 56 by locating stud 58 on attachment member 32 or lawn mower rear wall 30 at a location vertically above pivot axis 54.

At the other longitudinal end of first arm 42 a second arm 62 is provided and is pivotally connected to first arm 42 so that first arm 42 and second arm 62 can rotate with respect to one another about second pivot axis 64. Second arm 62 is preferably made of square or rectangularly-shaped steel tubing and at one longitudinal end thereof is provided with a cylindrical member 66. Cylindrical member 66 is also made of steel and is affixed to second arm 62 by welding or other suitable means. A second pin 68 is received through holes 70 of first arm upright walls 46 and through cylindrical member 66 and thereby allowing first arm 42 and second arm 62 to rotate with respect to one another about pivot axis 64.

Referring now more particularly to FIGS. 4, 5, and 7–10, there is shown a spring mechanism for biasing first arm 42 and second arm 62 toward one another about pivot axis 64 as indicated by arrows B. In this regard, a pivot member 72 is provided and includes cylindrical member 74 made of steel and having dogs 76 and 78 also made of steel affixed thereto by welding or other suitable means. Dogs 76 and 78 protrude radially outwardly from cylindrical member 74 and are spaced as shown approximately 60 to 80 degrees apart from one another. A pin 80 extends through holes 82 through first arm upright walls 46 and through cylindrical member 74 and thereby allowing cylindrical member 74 and dogs 76 and 78 affixed thereto to rotate about pivot axis 84.

A tension spring 86 at one end 88 thereof is connected to a portion of first arm 44 near cylindrical member 48. At the other end 90 of spring 86, spring 86 is connected to a generally V-shaped hook member 92. Hook member 92 at its other end thereof is pivotally connected via pivot pin 94 to dog 78. Dog 76 is pivotally connected to a coupling member such as a steel wire or a chain 96 via a pivot pin 98 and at its other end thereof is pivotally connected to dog 100 via a pivot pin 102. Similar to dogs 78 and 76, dog 100 is made of steel and is affixed to cylindrical member 66 by welding or other suitable means. Dog 100 extends radially outwardly from cylindrical member 66 at an angle of about 50 to 70 from second arm 62.

Figure 7:
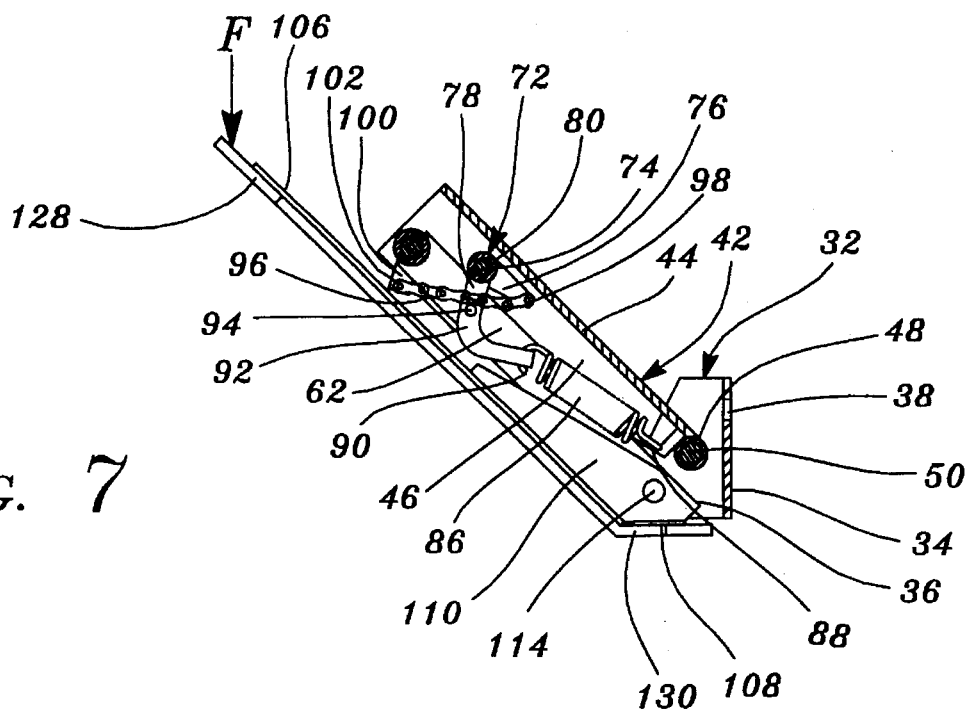
FIG. 7 is a cross-sectional view taken along line 7—7 of FIG. 5 and showing the apparatus in its retracted storage position.

In operation, tension spring 86 biases pivot member 72 in the direction indicated by arrow C. This, in turn, places chain 96 in tension and thereby biasing second arm 62 to pivot about axis 64 as indicated by arrows B and D. Advantageously, as shown in FIG. 7 whereat apparatus 26 is shown in its retracted storage position, dogs 78 and 100 are located generally perpendicular to their respective axes of rotation 84 and 68 and, also, perpendicular to the force provided by respective tension spring 86 and chain 96. Accordingly, when apparatus 26 is in its retracted position, a maximum torsional force is provided between first arm 42 and second arm 62 as indicated by arrows B and arrow D. First arm 42 and second arm 62 are thereby securely retained in their storage position whereat they are generally parallel to one another but in different planes.

Figure 8:
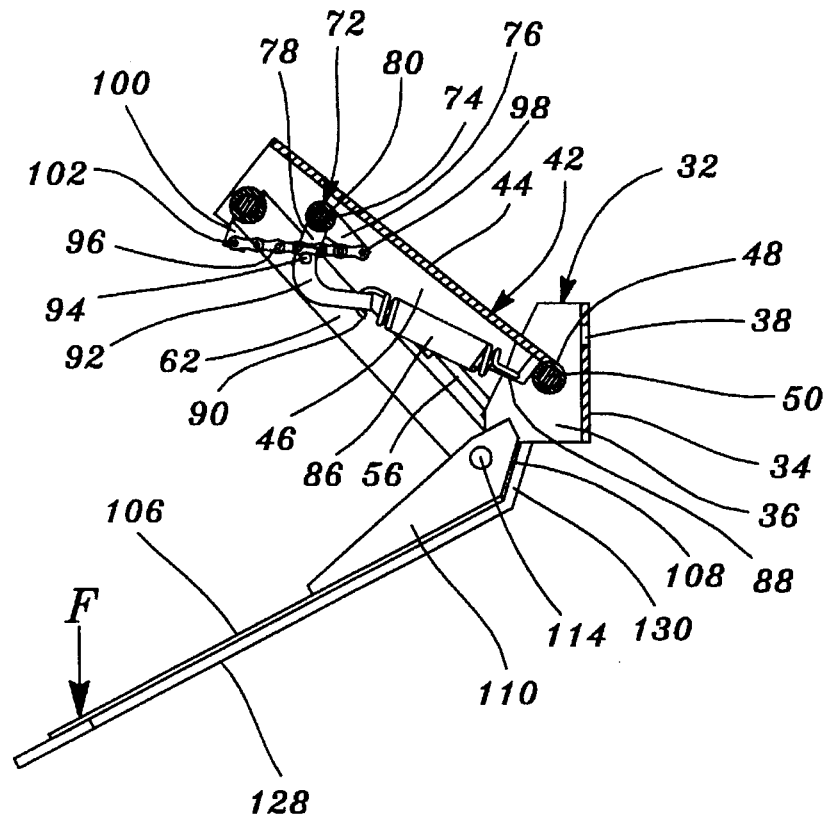
FIG. 8 is a sectional view taken along line 7—7 of FIG. 5 and showing the apparatus partially extended between its storage and in use positions.
Figure 9:
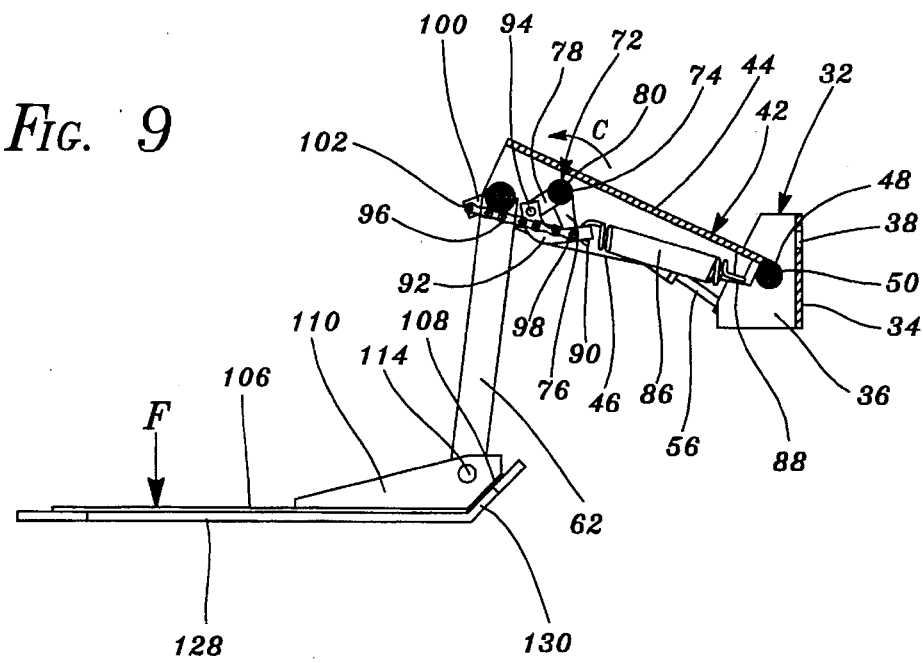
FIG. 9 is a cross sectional view taken generally along line 7—7 of FIG. 5 and showing the apparatus further extended between its storage and in use positions.
Figure 10:
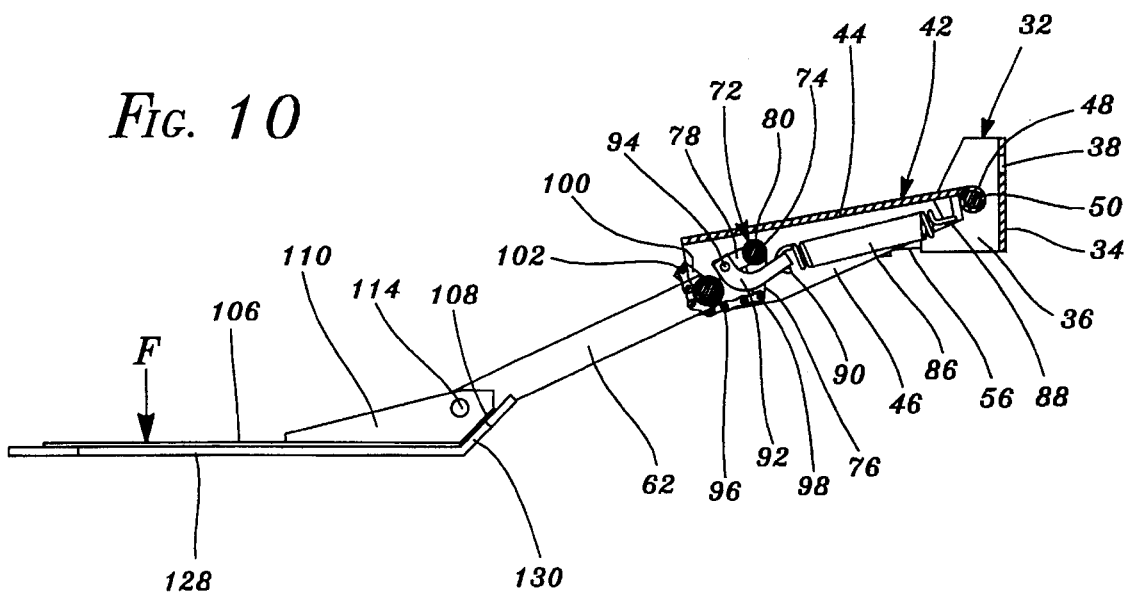
FIG. 10 is a cross sectional view taken generally along line 7—7 of FIG. 5 and showing the apparatus in its fully extended in use or ride behind position; and, FIG. 11 is a linkage schematic diagrammatically depicting a second embodiment of an apparatus attached to a self-propelled vehicle for transporting an operator therebehind.

As arms 42 and 62 are caused to pivot about axis 64 against the biasing force of spring 86 as shown in FIGS. 8 and 9, a torsional force continues to be applied. This is because the force of tension spring 86 continues to be applied at pin 94 at a radial distance from pivot axis 84. However, when apparatus 26 reaches its final extended or in use position as shown in FIG. 10 whereat arms 42 and 62 are generally parallel to one another and in the same plane, dog 78 has pivoted sufficiently so that in cooperation with hook member 92, the applicable force of tension spring 86 to pin 94 for creating a moment about pivot axis 84 is only a short radial distance from pivot axis 84. Therefore, in this position, the torsional force experienced by pivot member 72 and, thus, also between first arm 42 and second arm 62 is minimal.

It is noted that the force provided by spring 86, pivot axis 84, and pivot pin 94 are not allowed to become aligned and dog 78 is not allowed to pivot to a point where the torsional force about cylindrical member 72 is in a direction opposite that of arrow C since this would tend to lock or otherwise retain the apparatus in its extended in use position. Rather, it is preferred that a slight torsional force in the direction of arrow C and as indicated by arrows B continue to exist even though the apparatus is in its fully extended in use position as shown in FIG. 10. It is also noted that in this extended in use position, chain 96 is partly wrapped around cylindrical member 66, but, since it remains in tension, continues to provide a tangential force to dog 100 at pin 102. Again, the effective radial distance between the pivot axis 64 and the application of the tensional force of chain 96 is minimized since chain 96 is displaced by cylindrical member 66.

At its other longitudinal end, second arm 62 is pivotally connected to a support platform 104 whereupon the operator 28 may stand as shown in FIG. 2 while riding behind self-propelled lawn mower 10. Support platform 104 includes a standing plate 106 with a front angular wall 108 extending at an angle of about 35 to 55 degrees therefrom at the forward end of standing plate 106. Standing plate 106 and angular wall 108 are preferably made of steel and include a plurality of projections (not shown) on the upper surface thereof for preventing operator 28 from potentially slipping thereon. A pair of upright walls 110 also made of aluminum are located generally parallel to one another and perpendicular to standing plate 106 and angular wall 108. Upright walls 110 are affixed to plate 106 and wall 108 by welding or other suitable means.

Similar to the other end of second arm 62 a cylindrical member 112 is provided and is affixed to second arm 62. Cylindrical member 112 is made of steel and is affixed to second arm 62 by welding or other suitable means. A platform pin 114 extends through holes 116 through upright walls 110 and also through cylindrical member 112. Accordingly, support platform 104 and second arm 62 pivotally rotate with respect to one another about pivot axis 117.

A pair of torsion springs 118 are provided around cylindrical member 112 and include a first torque arm 120 connected to upright walls 110 through holes 122. The second torque arms 124 of torsion springs 118 are connected to second arm 62 by placement under beam 126 made of steel and affixed to second arm 62 by welding or other suitable means. As indicated by arrows E, torsion springs 118 pivotally bias support platform 104 and second arm 62 with respect to one another about pivot axis 117 and toward each other as also shown in FIGS. 7–10.

Support platform 104 further includes a sliding plate member 128 below standing plate 106 and forward sliding plate wall 130 generally below front angular wall 108. Sliding plate 128 and plate wall 130 are made of ultra high molecular weight polyethylene (UHMWPE) and rest on the ground 132 i.e., grass, dirt, concrete, etc., when apparatus 26 is in its fully extended in use position and the operator is standing thereon as shown in FIG. 2. It has been found that the frictional forces between sliding plate 128 and the ground 130 are generally negligible with respect to the overall apparatus, especially when the UHMWPE material is used. In the alternative, it is also contemplated that a pair of wheels with an axle therebetween can be used with respect to support platform 104 and thereby avoiding the need of a sliding plate member.

Figure 11:
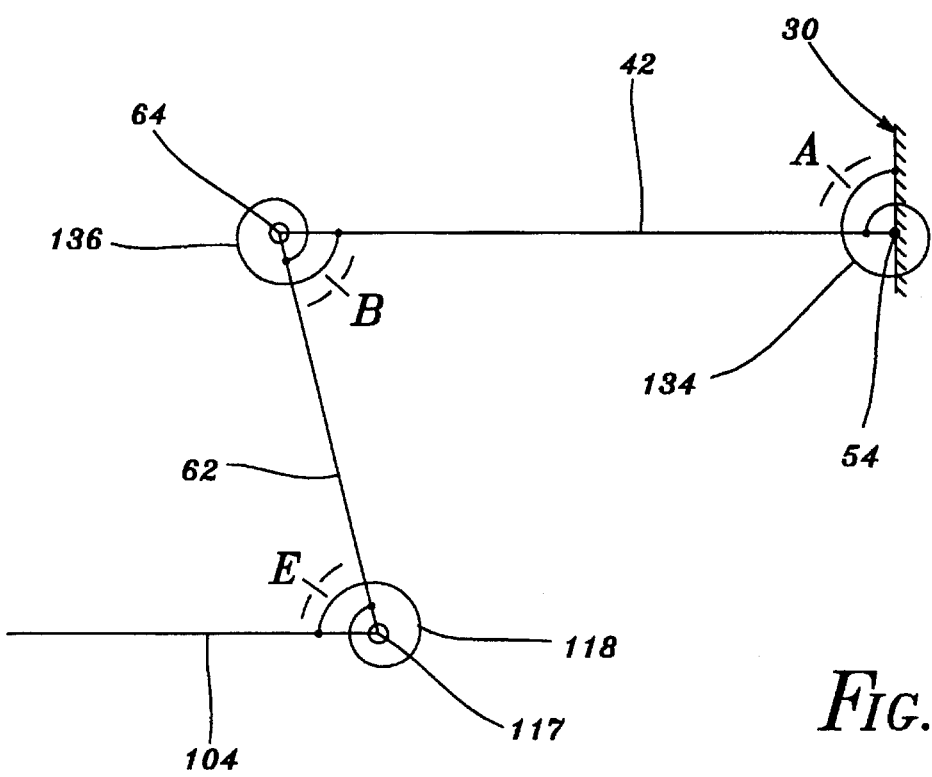

In FIG. 11, there is shown a different embodiment wherein a torsion spring 134 is used in place of first spring member 56 and first arm 42 is pivotally connected directly to rear wall 30 of lawn mower 10 and so as to rotate about pivot axis 54. Additionally, a torsion spring 136 is used and is connected between first arm 42 and second arm 62 for biasing arms 42 and 62 toward each other as indicated by arrows B.

Figure 3:
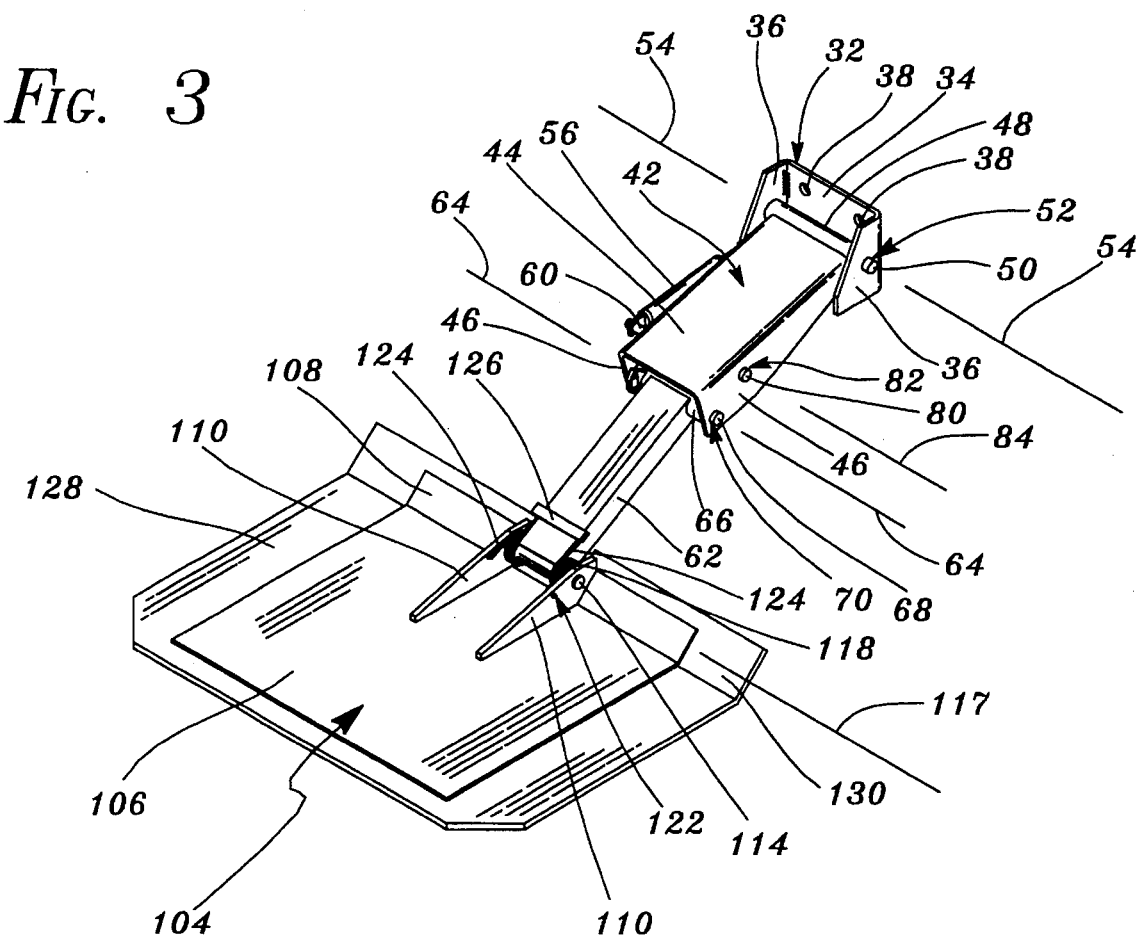
FIG. 3 is a perspective view of an apparatus attachable to a self-propelled vehicle for transporting an operator therebehind constructed in accordance with the principles of the present invention.

In operation, when apparatus 26 is in its retracted storage/walk behind position, it is as shown in dashed lines in FIG. 2 and as shown in FIG. 7 whereat the first arm 42, second arm 62 and support platform 104 are positioned generally parallel to one another but in different planes. When the operator 28 is desirous of using apparatus 26 in the extended ride behind mode, he merely reaches up with his foot and steps on the support platform 104 as indicated by arrow F in FIG. 7. The operator acts against the spring forces of the apparatus initially causing the support platform to be pivoted downwardly as indicated in FIG. 8. Thereafter, self-propelled lawn mower 10 is caused to move forwardly and thereby causing further pivotal motion between the various components and about pivot axes 54, 46, and 117 until apparatus 26 is fully extended as shown in FIGS. 1, 3 and 10.

The operator then merely stands on support platform 104 riding behind the lawn mower and controlling speed, direction, etc., in a normal and customary manner. When the operator desires to walk behind the lawn mower, he merely steps off of support platform 104 allowing the spring loaded apparatus 26 to be automatically retracted back in its storage position as shown in FIG. 7. As can be appreciated, this process can be repeated as often and as may be needed or desirable by the operator depending on the specific use of self-propelled lawn mower 10.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An apparatus attachable to a self-propelled vehicle for transporting an operator therebehind, said apparatus comprising:

an attachment member selectively attachable to a self-propelled vehicle;

a first arm pivotally connected to said attachment member;

a second arm pivotally connected to said first arm at a distance from said first arm pivotal connection to said attachment member; and, an operator support platform pivotally connected to said second arm at a distance from said second arm pivotal connection to said first arm, whereby said first and second arms and said support platform are selectively pivotable for placing said platform in a retracted storage position and in an extended in use position for carrying and transporting an operator behind the self-propelled vehicle.

2. The apparatus of claim 1 wherein in said retracted position, said first and second arms and said support platform are positioned in different planes and generally parallel to one another and in said extended position, said first and second arms and said support platform are located generally parallel to one another but in the same plane.

3. The apparatus of claim 1 further comprising a first spring connected between said attachment member and said first arm biasing said first arm generally upwardly.

4. The apparatus of claim 3 wherein said first spring is a compression spring.

5. The apparatus of claim 3 wherein said first spring is a torsion spring.

6. The apparatus of claim 3 further comprising spring means connected between said first and second arms for torsionally biasing said first and second arms about said pivotal connection therebetween and toward each other.

7. The apparatus of claim 6 wherein said spring means is a torsion spring.

8. The apparatus of claim 6 wherein said spring means comprises:

a pivot member pivotally connected to said first arm;

a second spring connected between said pivot member and said first arm pivotally biasing said pivot member; and, a coupling member connected between said pivot member and said second arm.

9. The apparatus of claim 8 wherein said coupling member is a chain.

10. The apparatus of claim 8 wherein said second spring is a tension spring.

11. The apparatus of claim 6 further comprising a third spring connected between said second arm and said support platform torsionally biasing said second arm and said support platform about said pivotal connection therebetween and toward each other.

12. The apparatus of claim 11 wherein said third spring is a torsion spring.

13. The apparatus of claim 11 wherein said support platform includes a sliding plate, whereby when said support platform is in said extended in use position said sliding plate comes in contact with and slides on a surface therebelow.

14. The apparatus of claim 13 wherein said sliding plate is made of ultra high molecular weight polyethylene.

15. The apparatus of claim 13 wherein in said retracted position, said first and second arms and said support platform are positioned in different planes and generally parallel to one another and in said extended position, said first and second arms and said support platform are located generally parallel to one another but in the same plane.

16. The apparatus of claim 1 further comprising spring means connected between said first and second arms for torsionally biasing said first and second arms about said pivotal connection therebetween and toward each other.

17. The apparatus of claim 16 wherein said spring means comprises:
 a pivot member pivotally connected to said first arm;
 a spring connected between said pivot member and said first arm pivotally biasing said pivot member; and,
 a coupling member connected between said pivot member and said second arm.

18. The apparatus of claim 1 further comprising a spring connected between said second arm and said support platform torsionally biasing said second arm and said support platform about said pivotal connection therebetween and toward each other.

19. The apparatus of claim 1 wherein said support platform includes a sliding plate, whereby when said support platform is in said extended in use position said sliding plate comes in contact with and slides on the surface therebelow.

20. The apparatus of claim 19 wherein said sliding plate is made of ultra high molecular weight polyethylene.

21. In combination, a self-propelled lawn mower and apparatus for transporting an operator behind the lawn mower, said apparatus comprising:
 a first arm pivotally connected to said lawn mower;
 a second arm pivotally connected to said first arm at a distance from said first arm pivotal connection to said lawn mower; and,
 an operator support platform pivotally connected to said second arm at a distance from said second arm pivotal connection to said first arm, whereby said first and second arms and said support platform are selectively pivotable for placing said platform in a retracted storage position and in an extended in use position for carrying and transporting an operator behind said self-propelled lawn mower.

22. The apparatus of claim 21 further comprising a spring connected between said lawn mower and said first arm biasing said first arm generally upwardly, spring means connected between said first and second arms for torsionally biasing said first and second arms about said pivotal connection therebetween and toward each other and, a third spring connected between said second arm and said support platform torsionally biasing said second arm and said support platform about said pivotal connection therebetween and toward each other.

23. The apparatus of claim 22 wherein said support platform includes a sliding plate and, wherein when said support platform is in said extended in use position said sliding plate comes in contact with and slides on a surface therebelow.

24. The apparatus of claim 23 wherein said sliding plate is made of ultra high molecular weight polyethylene.

25. The apparatus of claim 21 wherein said support platform includes a sliding plate and, wherein when said support platform is in said extended in use position said sliding plate comes in contact with and slides on the surface therebelow.

26. The apparatus of claim 25 wherein said sliding plate is made of ultra high molecular weight polyethylene.

27. An apparatus attachable to a self-propelled vehicle for transporting an operator therebehind, said apparatus comprising:
 a first arm adapted to be pivotally connected to a self-propelled vehicle;
 a second arm pivotally connected to said first arm at a distance from said first arm adapted pivotal connection to a self-propelled vehicle;
 an operator support platform pivotally connected to said second arm at a distance from said second arm pivotal connection to said first arm, whereby said first and second arms and said support platform are selectively pivotable for placing said platform in a retracted storage position and in an extended in use position for carrying and transporting an operator behind the self-propelled vehicle.

28. The apparatus of claim 27 further comprising spring means adapted to be connected between said first arm and the self-propelled vehicle for biasing the first arm generally upwardly.

29. The apparatus of claim 28 further comprising spring means connected between said first and second arms for torsionally biasing said first and second arms about said pivotal connection therebetween and toward each other.

30. The apparatus of claim 27 wherein said support platform includes a sliding plate and, wherein when said support platform is in said extended in use position said sliding plate comes in contact with and slides on a surface therebelow.

31. The apparatus of claim 30 wherein said sliding plate is made of ultra high molecular weight polyethylene.

* * * * *